US010951091B2

(12) United States Patent
Makarow et al.

(10) Patent No.: US 10,951,091 B2
(45) Date of Patent: Mar. 16, 2021

(54) ACTUATING DEVICE (71) Applicant: Mahle International GmbH, Stuttgart (DE)

(72) Inventors: Eugen Makarow, Ludwigsburg (DE); Edgar Salfeld, Lichtenwald (DE); Florian Wetzel, Baltmannsweiler (DE)

(73) Assignee: Mahle International GmbH

( * ) Notice: Subject to any disclaimer, the term of this patent is extended or adjusted under 35 U.S.C. 154(b) by 301 days.

(21) Appl. No.: 15/918,863

(22) Filed: Mar. 12, 2018

(65) Prior Publication Data

US 2018/0262086 A1 Sep. 13, 2018

(30) Foreign Application Priority Data

Mar. 13, 2017 (DE) .......................... 102017204100.5

(51) Int. Cl.
*F16H 1/16* (2006.01)
*F16H 57/023* (2012.01)
(Continued)

(52) U.S. Cl.
CPC ......... *H02K 7/1166* (2013.01); *F16H 57/023* (2013.01); *H02K 7/06* (2013.01);
(Continued)

(58) Field of Classification Search
CPC ...... F16H 57/023; F16H 57/02; F16H 57/031; F16H 57/033; F16H 57/0335
See application file for complete search history.

(56) References Cited

U.S. PATENT DOCUMENTS 2,623,406 A * 12/1952 Hansen ................. F16H 57/033
74/606 R
2,910,882 A * 11/1959 Wellauer .............. H02K 7/1163
74/412 R
(Continued)

FOREIGN PATENT DOCUMENTS

DE 1203075 B 10/1965
DE 1450737 A1 3/1969
(Continued)

*Primary Examiner* — Jake Cook
*Assistant Examiner* — Gregory Robert Weber
(74) *Attorney, Agent, or Firm* — Fishman Stewart PLLC (57) ABSTRACT An actuating device for mechanically actuating a component may include a housing having first and second housing parts lying against one another in a separation plane and fastened to one another, and an electric motor arranged in the first housing part and having an input shaft. The device may also include an output shaft rotatably mounted at least on the second housing part and penetrating a wall thereof, the output shaft one of (i) being connected externally on the second housing part with an actuating element for mechanical coupling with the component which is to be actuated, or (ii) forming an actuating element for mechanical coupling with the component which is to be actuated. The device may further include a gear connecting the input shaft with the output shaft, and having an output gearwheel rotatably connected with the output shaft. The second housing part, in relation to an axis of rotation running perpendicularly to the separation plane, may be able to be fastened to the first housing part in at least two different rotation positions. The output shaft may be arranged eccentrically to the axis of rotation on the second housing part. At least one of the first and second housing parts may have at least one bearing point for rotary bearing at least one additional gearwheel. In a first rotation position between the housing parts, the gear without the additional gearwheel may connect the input shaft with (Continued)

the output shaft with a first transmission ratio. In a second rotation position different from the first rotation position, between the housing parts, the gear with the additional gearwheel may connect the input and output shafts with a second transmission ratio different from the first transmission ratio.

19 Claims, 4 Drawing Sheets

(51) Int. Cl.
    *H02K 7/06*     (2006.01)
    *H02K 7/116*    (2006.01)
    *F16H 1/06*     (2006.01)
    *F16H 57/021*   (2012.01)

(52) U.S. Cl.
    CPC ............... *F16H 1/06* (2013.01); *F16H 1/16* (2013.01); *F16H 2057/0213* (2013.01)

(56) References Cited

U.S. PATENT DOCUMENTS

| | | | | |
|---|---|---|---|---|
| 3,864,990 | A | * | 2/1975 | Lacoste ............... F16H 57/033 74/606 R |
| 4,441,378 | A | | 4/1984 | Ponczek |
| 5,273,480 | A | | 12/1993 | Suto |
| 6,202,507 | B1 | * | 3/2001 | Phillips ............... F16H 57/021 74/606 R |
| 2005/0223832 | A1 | * | 10/2005 | Li ........................ H02K 7/1166 74/425 |
| 2015/0349610 | A1 | * | 12/2015 | Tryens ................. H02K 11/22 310/68 B |

FOREIGN PATENT DOCUMENTS

| | | |
|---|---|---|
| DE | 9217247 U1 | 5/1993 |
| JP | 3001455 U | 8/1994 |

* cited by examiner

ACTUATING DEVICE

CROSS-REFERENCE TO RELATED APPLICATIONS

This application claims priority to German Patent Application No. DE 10 2017 204 100.5, filed on Mar. 13, 2017, the contents of which are incorporated herein by reference in its entirety.

TECHNICAL FIELD

The present invention relates to an actuating device for mechanically actuating a component.

BACKGROUND

In many fields of engineering, a component must be actuated mechanically. Especially in internal combustion engines or respectively in motor vehicles, several components are to be found which must be actuated mechanically. In the present context, preferably components are considered here such as throttle valves, exhaust flaps, waste gate valves, variable turbine geometries. Likewise, applications in the field of thermomanagement systems are conceivable, for example for the actuation of respective valves.

For actuating these components, actuating devices can come into use, which have, in a housing, an electric motor which is drivingly connected, via a gear likewise arranged in the housing, to an actuating element arranged externally on the housing. The actuating element can now be coupled mechanically to the component which is to be actuated. Various transmission ratios can be necessary for the gear for different cases of application of the actuating device. In order to be able to provide different actuating devices, which differ from one another through different transmission ratios of the gear, a comparatively great logistical effort is necessary, which is accompanied by correspondingly high costs.

SUMMARY

The present invention is concerned with the problem of indicating for an actuating device of the type described above an improved embodiment, which is distinguished in particular by reduced costs in the formation of variants.

This problem is solved according to the invention by the subject of the independent claim. Advantageous embodiments are the subject of the dependent claims.

The invention is based on the general idea of dividing the housing in a separation plane into a first housing part and into a second housing part, of accommodating the electric motor in the first housing part and of mounting on the second housing part an output shaft which penetrates a wall of the second housing part and which can be connected externally on the second housing part with said actuating element. Furthermore, the invention proposes configuring the two housing parts so that they can be fastened to one another in at least two different rotation positions in relation to an axis of rotation running perpendicular to the separation plane. Through an eccentric positioning of the output shaft with respect to the axis of rotation, an installation space for the gear can be provided in the housing, which gear couples an input shaft of the electric motor with the output shaft. Owing to the eccentric output shaft, this installation space depends on the current rotation position between the housing parts. Through the variable installation space which is available for accommodating the gear in the housing, different configurations can be realized with various transmission ratios for the gear, wherein a plurality of common parts can be used. For example, in this variant formation, the housing parts, the electric motor and the output shaft with actuating element can remain unchanged. The use of common parts in different variants of the actuating device reduces the manufacturing costs.

In detail, the invention proposes that the gear has an output gearwheel which is connected to the output shaft in a torque-proof manner. In addition, the first housing part and/or or the second housing part are equipped with at least one bearing point by which at least one additional gearwheel of the gear can be rotatably mounted. In a first rotation position between first housing part and second housing part, the gear connects, without integration of the respective additional gearwheel, the input shaft with the output shaft and defines here a first transmission ratio. In a second rotation position, different from the first rotation position, between first housing part and second housing part, the gear now connects the input shaft with the output shaft with integration of the respective additional gearwheel, and defines here a second transmission ratio different from the first transmission ratio. In other words, for the variant formation of the actuating drive, only the respective additional gearwheel is necessary which in the first rotation position is not integrated into a force path leading from the input shaft to the output shaft, whereas in the second rotation position it is integrated into this force path. Except for the respective additional gearwheel, the actuating device in the at least two variants presented here, which are defined by the two said different transmission ratios, consists of the same component parts. Hereby, the variant formation becomes particularly economically priced.

It is clear that basically a single additional gearwheel is sufficient in order to be able to form the variants with different transmission ratios. Likewise, however, embodiments are conceivable, in which two or three or more additional gearwheels can come into use, in order to realize different transmission ratios. Likewise, it is clear that also more than two different rotation positions are able to be realized between the two housing parts, wherein in the third rotation position, compared to the second rotation position, a different additional gearwheel or a different number of additional gearwheels can come into use, in order to set a third transmission ratio, which differs from the first and second transmission ratio.

Such an additional gearwheel has two axially adjacent gearwheel portions with different diameters and numbers of teeth, in order to define a transmission stage in the gear.

In an advantageous embodiment, the respective additional gearwheel can be absent in the first rotation position, whereas it is present in the second rotation position. Alternatively thereto, the respective additional gearwheel can also be present in the first rotation position, but positioned so that it is not integrated into the gear. In this variant, the respective additional gearwheel is without function in the first rotation position; it can co-rotate here, but does not have to. This structural form, however, makes possible at any time a conversion of the actuating drive for the realization of the second rotation position. In contrast thereto, the embodiment in which the respective additional gearwheel is absent in the first rotation position is more cost-efficient.

In a further development, the gear can have a worm drive, which has a worm connected to the input shaft in a torque-proof manner. In connection with such a worm drive, it is possible in particular to arrange the electric motor horizontally in a relatively flat housing. With a horizontal electric motor, the rotation axis of the electric motor extends substantially parallel to the separation plane.

In so far as the gear has a worm drive, the latter can have in addition a worm wheel, which is directly in engagement with the worm. Advantageously, provision can then be made that the respective additional gearwheel in the second rotation position is integrated into the gear between the worm wheel and the output gearwheel. Expediently, provision can then be made for the first rotation position that the worm wheel is then directly in engagement with the output gearwheel. In connection with the worm drive, comparatively great transmission ratios can be realized. Likewise, a worm drive simplifies a self-locking configuration of the drive connection between actuating element and deactivated electric motor.

Another embodiment, which likewise operates with a worm drive, proposes that the output gearwheel in the first rotation position is directly in engagement with the worm. In this case, the output gearwheel itself forms a worm wheel. In the second rotation position, the respective additional gearwheel is then integrated into the gear between the worm and the output gearwheel, so that the additional gearwheel is in engagement directly with the output gearwheel and/or directly with the worm. If only one single additional gearwheel is present, the latter is directly in engagement both with the output gearwheel and also with the worm.

An embodiment is preferred here in which at least two additional gearwheels are provided, so that in the second rotation position the one additional gearwheel, therefore one of the additional gearwheels, is directly in engagement with the worm, whereas the other additional gearwheel, therefore another of the additional gearwheels, is directly in engagement with the output gearwheel. In so far as only two additional gearwheels are provided, these are directly in engagement with one another. If, on the other hand, three or more additional gearwheels are present, each further additional gearwheel is arranged between the two above-mentioned additional gearwheels.

Another embodiment proposes that the rotation axes of the respective additional gearwheel and of the output gearwheel run parallel to the axis of rotation, whereas the rotation axis of the input shaft runs transversely to the axis of rotation. Hereby, the electric motor can be arranged horizontally in the housing. Consequently, the housing can be configured comparatively flat. With a flat type of construction, the housing has its smallest dimension parallel to the axis of rotation.

An alternative is an embodiment in which the rotation axes of the respective additional gearwheel, of the output gearwheel and of the input shaft run parallel to the axis of rotation. In this case, the electric motor can be arranged vertically in the housing. Hereby, a comparatively compact structural form is realized radially to the axis of rotation. With a vertical electric motor, its rotation axis extends substantially perpendicularly to the separation plane.

Basically, depending on the load of the actuating device, it can be sufficient to mount the output shaft exclusively on the second housing part. However, an embodiment is preferred in which the output shaft is rotatably mounted on the first housing part and on the second housing part. A particularly advantageous further development of this embodiment proposes that the output shaft on the first housing part has a first bearing point, in which the output shaft is mounted in the first rotation position, and a second bearing point, in which the output shaft is mounted in the second rotation position. In addition, a further bearing point is assigned to the output shaft on the second housing part, in which bearing point the output shaft is mounted both in the first rotation position and also in the second rotation position. In this way, a particularly stable bearing can be realized respectively for the output shaft for the different rotation positions. When three or more rotation positions are present, on the first housing part also three or more bearing points can be provided, whereas on the second housing part always only one single bearing point is provided for the output shaft.

In another advantageous embodiment, the gear can have a reversing gearwheel, which has three axially adjacent gearwheel portions which have different diameters and numbers of teeth. The three gearwheel portions form here an input gearwheel portion, a first output gearwheel portion and a second output gearwheel portion. The input gearwheel portion is arranged here axially between the first output gearwheel portion and the second output gearwheel portion. Furthermore, provision is made in this embodiment that in the first rotation position the reversing gearwheel is integrated into the gear in a first reversing position, wherein preferably the output gearwheel is directly in engagement with the first output gearwheel portion. In the second rotation position, on the other hand, the reversing gearwheel is integrated into the gear in a second reversing position, reversed with respect to the first reversing position. Preferably, the output gearwheel is then directly in engagement with a first gearwheel portion of the respective additional gearwheel, whilst the second output gearwheel portion of the reversing gearwheel is directly in engagement with a second gearwheel portion of the same or of another additional gearwheel. The reversing of the reversing gearwheel takes place by rotation of the reversing gearwheel about a reversing axis which runs parallel to the separation plane. Through the use of such a reversing gearwheel, the transmission ratio can be changed significantly for variant formation, wherein the reversing gearwheel comes into use in both variants, which increases the number of common parts and reduces the costs of the variant formation.

According to a further development, the gear can again have a worm drive, wherein the input gearwheel portion of the reversing gearwheel in the first reversing position and in the second reversing position is respectively directly in engagement with the worm. Hereby, the variant formation in connection with the worm drive becomes particularly simple.

Another embodiment proposes that a rotation position sensor is attached to the first housing part, which rotation position sensor determines the current rotation position of the input shaft. Via the position of the input shaft, with existing mechanical coupling between input shaft and output shaft, the current rotation position of the output shaft and therefore the current rotation position of the actuating element can also always be determined.

In another embodiment, which is able to be realized alternatively or additionally, a rotation position sensor can be attached to the second housing part, which rotation position sensor determines the current rotation position of the output shaft. Hereby, the current rotation position of the output put shaft and therefore the rotation position of the actuating element can be determined directly or respectively more precisely.

Furthermore, power electronics for the electrical supply and activation of the electric motor can be arranged in the housing. The power electronics can be coupled here electrically or respectively electronically to the respective rotation position sensor. In so far as only one rotation position sensor comes into use, the power electronics are expediently accommodated in the same housing part in which the rotation position sensor is also situated.

Each of the torque-proof connections mentioned above and to be mentioned in addition below is expediently configured as an indirect or direct rotary connection. For example, the respective rotary connection can be formed by a direct fixing of the rotationally connected components to one another, in particular by form fit, friction fit or material bonding. Likewise, a coupling can be contained in this rotary connection. In addition, the respective rotary connection can be independent of rotation direction or, e.g. in combination with a freewheel, can be dependent on rotation direction.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically.

DETAILED DESCRIPTION

According to FIGS. 1 to 5, an actuating device 1, which can be used for the mechanical actuating of a component, which is not shown here, comprises a housing 2. The housing 2 is divided in a separation plane 3, which can only be seen in FIG. 5 and runs in FIGS. 1 to 4 parallel to the plane of the drawing, so that it has a first housing part 4 and a second housing part 5. Further housing parts are not thereby ruled out. However, a structural form is preferred in which the housing 2 is formed only from these two housing parts 4, 5. In FIGS. 1 to 4, the first housing part 4 and the second housing part 5 are arranged one over the other in the direction of viewing. For better demonstration, the housing part facing the observer is presented here so as to be transparent. In any case, the two housing parts 4, 5 lie against one another in the separation plane 3. In addition, the two housing parts 4, 5 are fastened to one another in a suitable manner. Appropriate fastening means are not, however, illustrated here.

The actuating device 1 has, in addition, an electric motor which has, in a conventional manner, a stator 7 and a rotor 8 with a rotor shaft 9. The rotor shaft 9 is directed axially out from the stator 7 and forms an input shaft 10 of the electric motor 6. The electric motor 6 is arranged in the first housing part 4. This means that the electric motor 6 is secured to the first housing part 4. In particular in the first housing part 4 an installation site is formed for receiving the electric motor 6. It is clear that in the assembled state of the housing 2, the electric motor 6 can also project into the second housing part 5.

The actuating device 1 is equipped in addition with an output shaft 11, which is rotatably mounted on the second housing part 5. Furthermore, the output shaft 11 penetrates a wall 12 of the second housing part 5, which faces the observer in FIGS. 1 and 4. Externally on the second housing part 5 the output shaft 11 can be connected in a torque-proof manner with an actuating element 13, indicated in FIG. 5. The actuating element 13 then serves for the mechanical coupling with the component which is to be actuated. For example, the actuating element 13 has, for this, a lever arm 14, connected to the output shaft 11 in a torque-proof manner, and a pin 15, arranged eccentrically to the output shaft 11 on the lever arm 14. Via the pin 15, the actual coupling with the component which is respectively to be actuated can then take place.

Furthermore, the actuating device 1 has in the housing 2 a gear 16, which mechanically connects the input shaft 10 with the output shaft 11. The gear 16 comprises an output gearwheel 17, which is connected to the output shaft 11 in a torque-proof manner.

Figure 1:
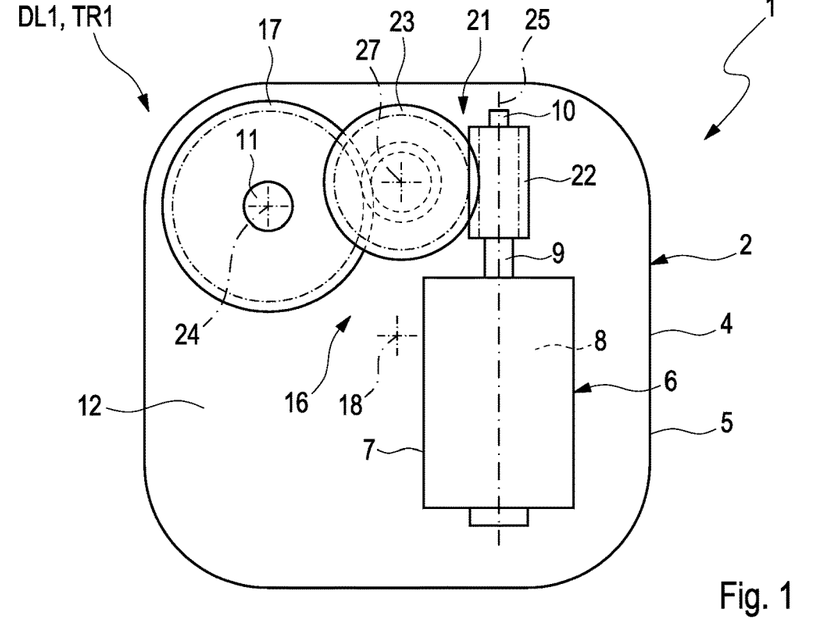
FIG. 1 a highly simplified view, in the manner of a schematic diagram, of an actuating device in a first rotation position, FIG. 2 a view of the actuating device as in FIG. 1, but in a second rotation position, FIG. 3 a view as in FIG. 1, but in another embodiment of the actuating device in the first rotation position, FIG. 4 a view of the actuating device as in FIG. 3, but in the second rotation position, FIG. 5 another view of the actuating device, but in a further embodiment, FIG. 6 an isometric view of the actuating device in another embodiment in the region of a gear in the first rotation position, FIG. 7 an isometric view of the actuating device in the region of the gear as in FIG. 6, but in the second rotation position, FIG. 8 an isometric view of a reversing gearwheel of the gear.
Figure 2:
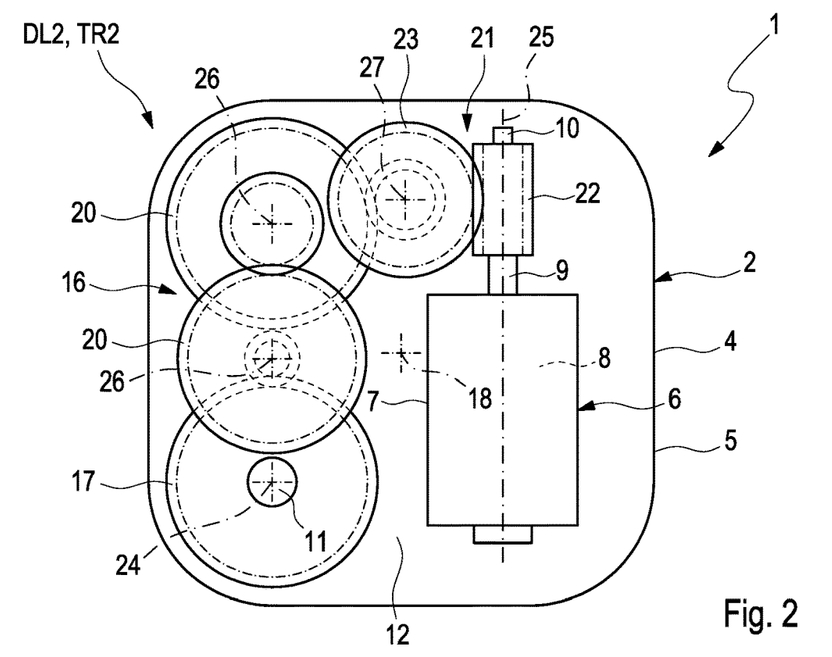
Figure 3:
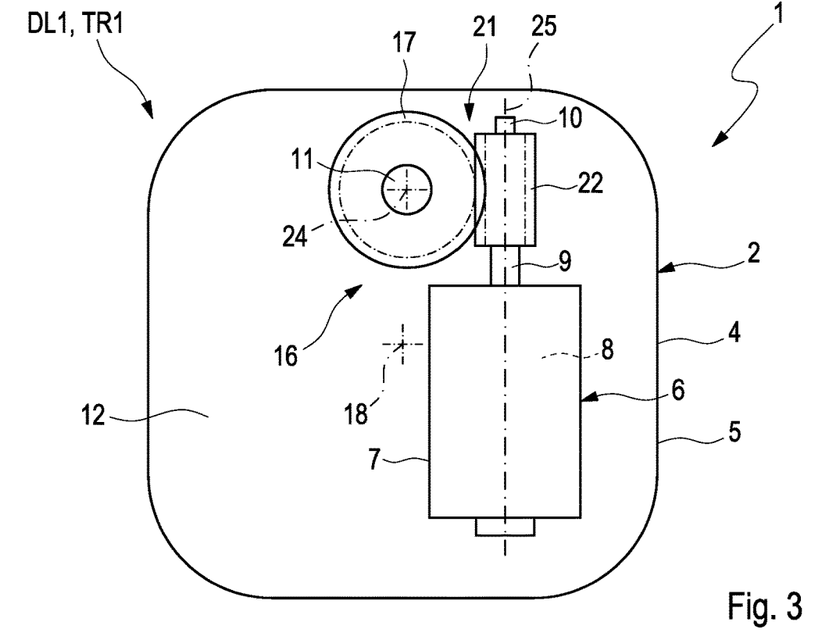
Figure 4:
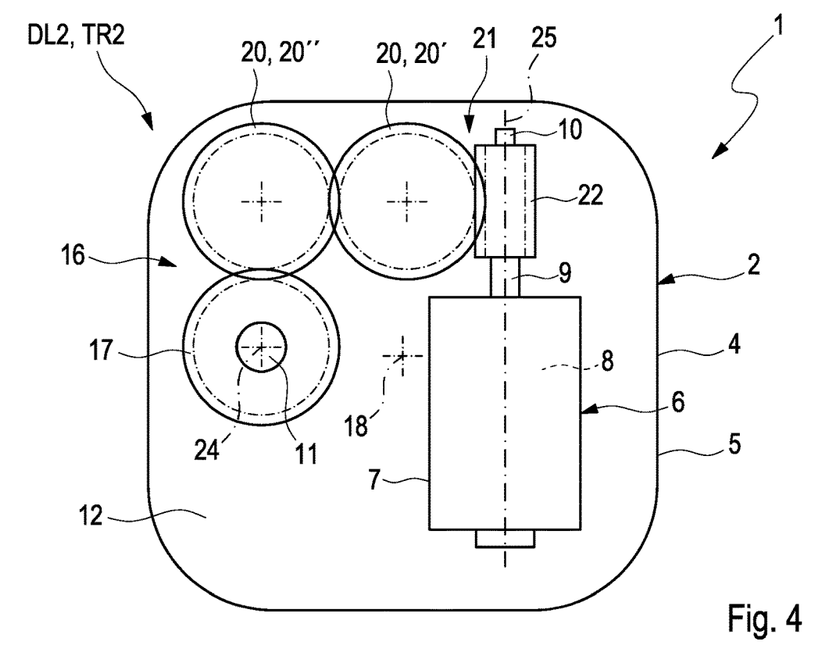

The first housing part 4 and second housing part 5 are configured so as to be rotationally symmetrical with respect to an axis of rotation. The axis of rotation 18 stands perpendicularly on the separation plane 3 and accordingly stands perpendicularly on the plane of the drawing in FIGS. 1 to 4. In the examples of FIGS. 1 to 4, the housing 2 has a substantially square cross-section perpendicularly to the axis of rotation 18, wherein rounded corners are provided in FIGS. 1 and 2. Hereby, a total of four rotation positions result for the two housing parts 4, 5, in which the two housing parts 4, 5 are able to be placed congruently on one another axially, therefore parallel to the axis of rotation 18. Provision is made that the second housing part 5 can be fastened to the first housing part 4 in at least two different rotation positions with respect to the axis of rotation 18. In FIGS. 1 and 3 respectively a first rotation position DL1 is illustrated, whilst FIGS. 2 and 4 show a second rotation position DL2. With a housing 2, which has a square cross-section in the separation plane 3, basically four different rotation positions can be realized between the two housing parts 4, 5. Basically also other rotationally symmetrical cross-sections are conceivable for the housing 2, such as e.g. in the form of an isosceles triangle or regular pentagon or polygon. Likewise, e.g. an elliptical cross-section enables two different rotation positions. A circular cross-section, on the other hand, enables virtually any desired number of rotation positions.

The output shaft 11 is eccentric to the axis of rotation 18, therefore is arranged with a radial distance. By changing the rotation position between the two housing parts 4, 5, owing to the eccentric output shaft 11 the installation space available for the gear 16 in the housing 2 can be varied, because the output shaft 11 on turning of the second housing part 5 relative to the first housing part 4 changes its relative position to the output shaft 10.

Figure 5:
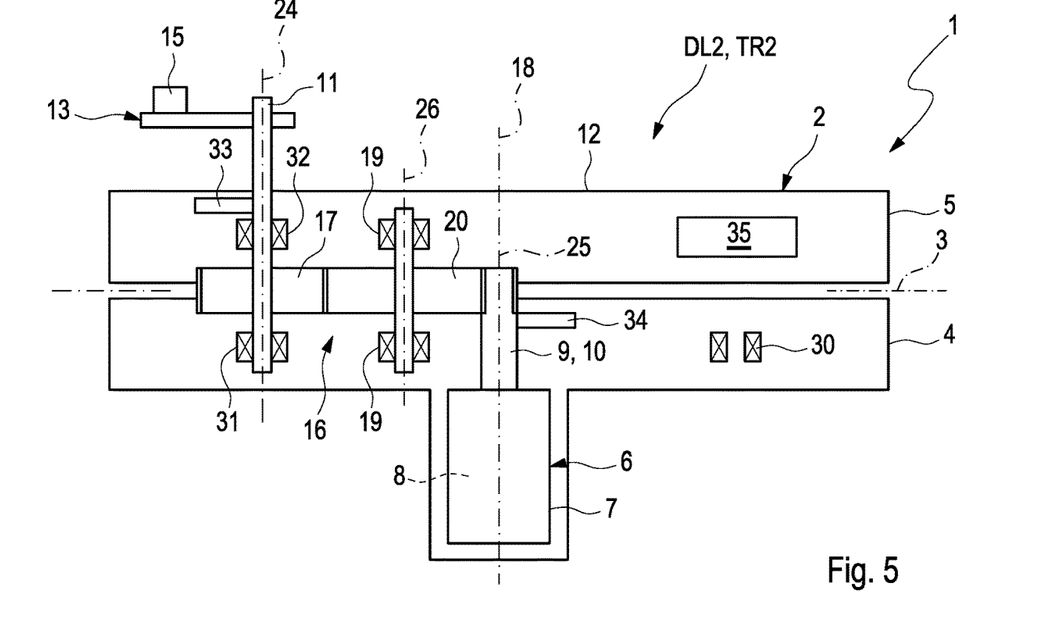

The first housing part 4 and/or the second housing part 5 have at least one bearing point 19, only indicated in FIG. 5, for the rotating bearing at least of one additional gearwheel 20 of the gear 16. In the example of FIG. 5, both the first housing part 4 and also the second housing part 5 have respectively at least one such bearing point 19 for at least one such additional gearwheel 20.

The housing parts 4, 5 are now coordinated with one another so that in the first rotation position DL1 according to FIGS. 1 and 3 the gear 16, in the case of an absent additional gearwheel 20 or respectively without the respective additional gearwheel 20, connects the input shaft 10 with the output shaft 11 and in so doing realizes a first transmission ratio TR1. In the second rotation position DL2 shown in FIGS. 2 and 4, the gear 16 now together with the respective additional gearwheel 20 connects the input shaft 10 with the output shaft 11, whereby a second transmission ratio TR2 is realized, which differs from the first transmission ratio TR1. In the second rotation position DL2, the respective additional gearwheel 20 therefore forms an active component part of the gear 16, in order to generate the second transmission ratio TR2.

The structural form presented here is preferred in this, in which the respective additional gearwheel 20 is absent in the first rotation position DL1 and is only present in the second rotation position DL2. An embodiment is also conceivable, in which the respective additional gearwheel 20 is also present in the first rotation position DL1, but is not yet actively integrated there into the gear 16. The respective additional gearwheel 20 is then without function or respectively without effect in the first rotation position DL1 with regard to the first transmission ratio TR1.

In the embodiments of FIGS. 1 to 4, 6 and 7, the gear 16 is equipped with a worm drive 21. The worm drive 21 has a worm 22, which is connected to the input shaft 10 in a torque-proof manner. In the example of FIGS. 1 and 2, the worm drive 21 has, in addition, a worm wheel 23, which is directly in engagement with the worm 22. In the first rotation position DL1 according to FIG. 1, the worm wheel 23 is directly in engagement with the output gearwheel 17. In contrast thereto, in the second rotation position DL2 according to FIG. 2 the respective additional gearwheel 20 is integrated into the gear 16 between the worm wheel 23 and the output gearwheel 17. In the example provided here, precisely two additional gearwheels 20 are provided, in order to achieve a particularly high second transmission ratio TR2.

In the example of FIGS. 3 and 4 no separate worm wheel 23 is provided, rather, the output gearwheel 17 or the respective additional gearwheel 20 can serve here as worm wheel and be in engagement with the worm 22. In detail, in the first rotation position DL1 according to FIG. 3 a direct engagement is provided between the output gearwheel 17 and the worm 22, whereas in the second rotation position DL2 according to FIG. 4 the respective additional gearwheel 20 is integrated into the gear 16 between the worm 22 and the output gearwheel 17. In the example of FIG. 4, precisely two additional gearwheels 20 are provided. In the second rotation position DL2 the one or first additional gearwheel 20' is directly in engagement with the worm 22, whereas the other or second additional gearwheel 20" is directly in engagement with the output gearwheel 17. The two additional gearwheels 20', 20" are, for their part, directly in engagement with one another here. In so far as three or more additional gearwheels 20 are provided, these can be integrated into the gear 16 in a suitable manner between the first additional gearwheel 20' and the second additional gearwheel 20".

The constellation of FIG. 3 shows the actuating device 1 with the housing 2 in the first rotation position DL1, wherein the gear 16 has the first transmission ratio TR1. The constellation of FIG. 4 shows the actuating device 1 with the housing 2 in the second rotation position DL2, wherein the gear 16 has the second transmission ratio TR2. In order to simplify the depiction of FIG. 4, the two additional gearwheels 20' and 20" and also the output gearwheel 17 are depicted as having the same diameter and therefore the same number of teeth. It is obvious for the skilled person that the output gearwheel 17 and at least one of the additional gearwheels 20', 20" must have different diameters and numbers of teeth in order to achieve the different transmission ratios TR1 and TR2 for the gear 16 in the two constellations of FIGS. 3 and 4. Additionally, also the two additional gearwheels 20', 20" may have different diameters and numbers of teeth.

In the embodiment of FIGS. 3 and 4 the two additional gearwheels 20', 20" are realized as single gearwheels having only a single gearwheel portion, which forms an input gearwheel portion and simultaneously an output gearwheel portion. In contrast to this, FIGS. 1 and 2 depict an embodiment, in which the two additional gearwheels 20 and also the worm wheel 23 are realized as double gearwheels having two axially adjacent gearwheel portions, which form an input gearwheel portion and a separate output gearwheel portion. It is clear, that also in the embodiment of FIGS. 3 and 4, at least one of the additional gearwheels 20', 20" can be realized as such a double gearwheel having two axially adjacent gearwheel portions, which form an input gearwheel portion and a separate output gearwheel portion.

Figure 6:
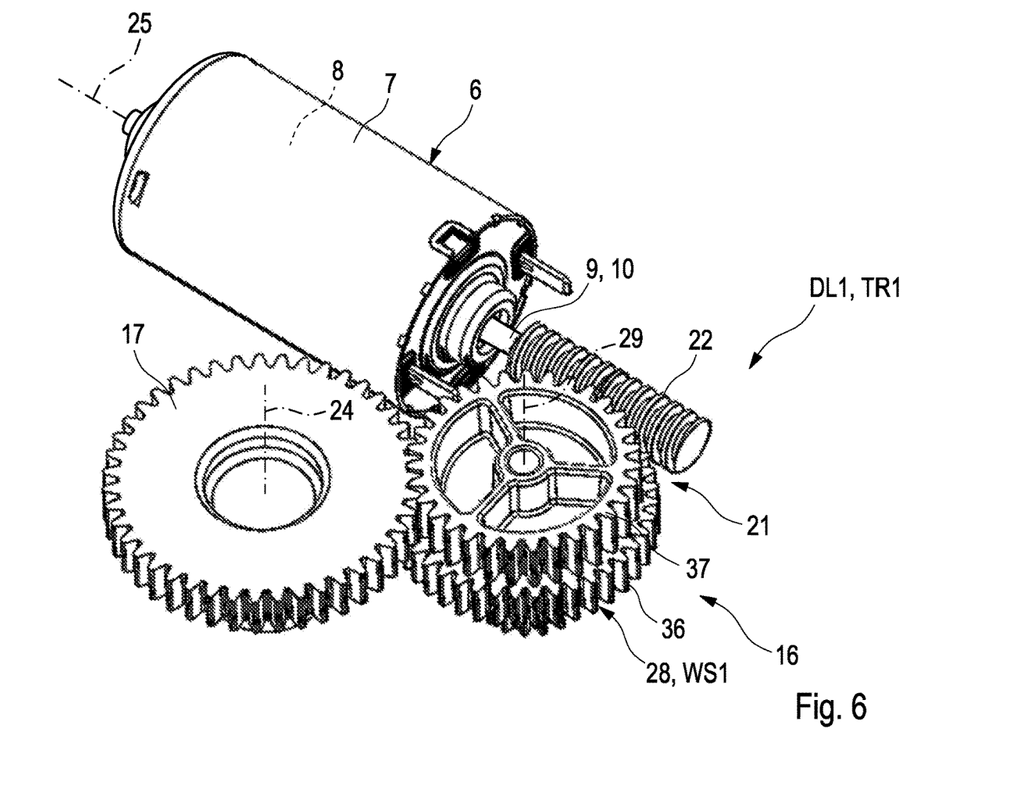
Figure 7:
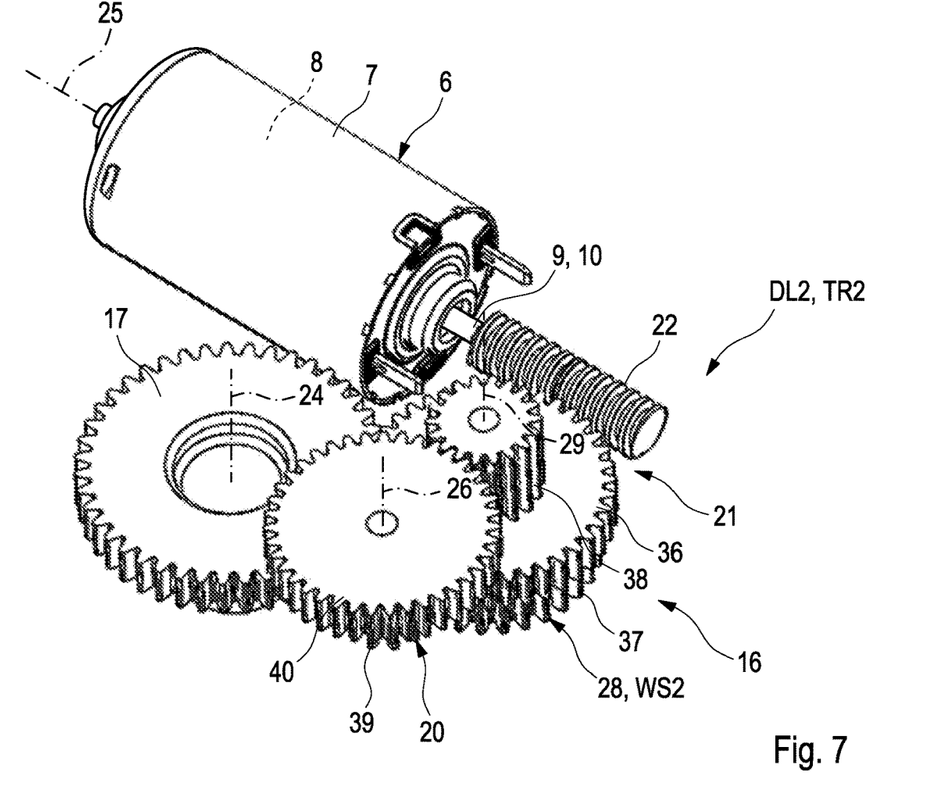
Figure 8:
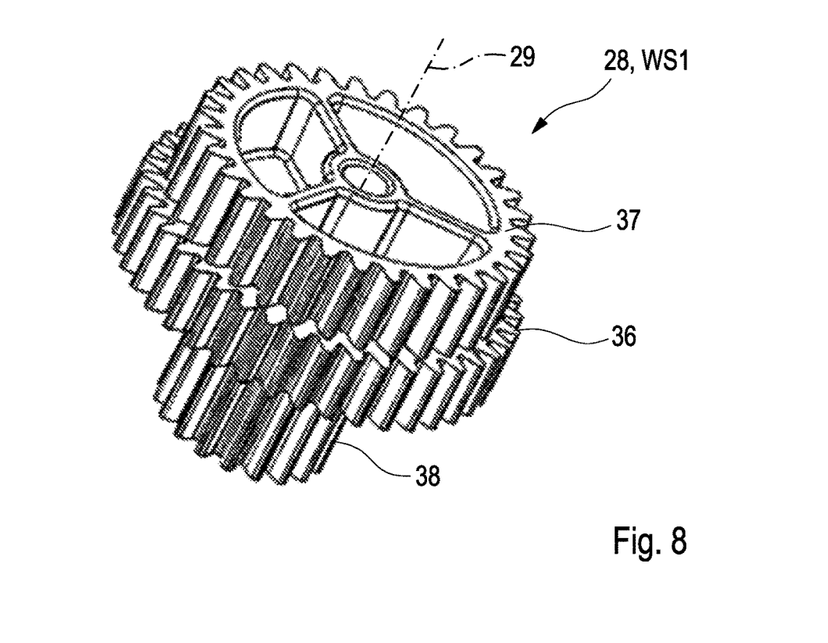

The output shaft 11 and the output gearwheel 17 have a rotation axis 24. The input shaft 10 has a rotation axis 25, and the respective additional gearwheel 20 has a rotation axis 26. The worm wheel 23, which may be present, has a rotation axis 27. In the example of FIGS. 6 to 8, the gear 16 has in addition a reversing gearwheel 28, the function of which is explained in greater detail further below. In any case, a rotation axis 29 is likewise assigned to this reversing gearwheel 28. The rotation axis 25 of the input shaft 10 corresponds here at the same time to the rotation axis 25 of the rotor shaft 9 or respectively of the rotor 8 or respectively of the electric motor 6.

In the examples of FIGS. 1 to 4 and 6 to 8, the rotation axes 24, 26, 27, 29 of the output gearwheel 17, of the respective additional gearwheel 20, of the worm wheel 23 which may be present, and of the reversing wheel 28 which may be present, run respectively parallel to the axis of rotation 18, whereas the rotation axis 25 of the input shaft 10 or respectively of the electric motor 6 runs transversely to the axis of rotation 18, therefore parallel to the separation plane 3. Hereby, it is possible to arrange the electric motor 6 horizontally in the housing 2, so that the housing 2 can be dimensioned so as to be comparatively small in the axial direction, therefore parallel to the axis of rotation 18, and can therefore be constructed so as to be flat.

In contrast thereto, FIG. 5 shows purely by way of example an embodiment in which all the rotation axes 24, 25, 26, 27, 29, therefore also the rotation axis 25 of the input shaft 10 or respectively of the electric motor 6, run parallel to the axis of rotation 18. In this case, the electric motor 6 is arranged vertically in the housing 2.

In FIG. 5 in addition by way of example for all the embodiments shown here, it is illustrated that the output shaft 11 has on the first housing part 4 a first bearing point 30, in which the output shaft 11 is mounted in the first rotation position DL1. In addition, the output shaft 11 has on the first housing part 4 a second bearing point 31, in which the output shaft 11 is mounted in the second rotation position L2. In FIG. 5 the second rotation position DL2 is illustrated, so that the output shaft 11 is mounted on the first housing part 4 in the second bearing point 31. In contrast thereto, for the output shaft 11 on the second housing part 5 only one further bearing point 32 is formed, in which the output shaft 11 is mounted both in the first rotation position DL1 and also in the second rotation position DL2.

Likewise representative for all the embodiments shown here, in FIG. 5 a rotation position sensor 33 is indicated, by means of which the current rotation position of the output shaft 11 can be determined. This rotation position sensor 33 is mounted or respectively fastened for this on the second housing part 5. By changing the rotation position between the two housing parts 4, 5, the relative position between this rotation position sensor 33 and the output shaft 11 remains unchanged.

Additionally or alternatively, according to FIG. 5 another rotation position sensor 34 can be provided for determining the current rotation position of the input shaft 10. This further rotation position sensor 34 is fastened here on the first housing part 4, so that it does not change its position with respect to the input shaft 10 when the rotation position between the two housing parts 4, 5 is varied.

According to FIG. 5 in the housing 2 in addition power electronics 35 can be arranged, which serve for the electrical supply and activation of the electric motor 6. They are electrically coupled to the electric motor 6 in a suitable manner. In addition, the power electronics 35 can be electrically coupled to the respective rotation position sensor 33, 34. In so far as only one rotation position sensor 33, 34 is arranged in the housing 2, the power electronics 35 are accommodated in the housing part 4, 5 in which the respective rotation position sensor 33, 34 is also situated. In so far as therefore preferably only the rotation position sensor 33, fixed to the second housing part 5, is present for determining the rotation position of the output shaft 11, the power electronics 35 are likewise incorporated into the second housing part 5.

According to FIGS. 6 to 8, the gear 16 can have in addition the reversing gearwheel 28 which was already mentioned above. The reversing gearwheel 28 has, according to FIGS. 7 and 8, three axially adjacent gearwheel portions, which differ from one another by different diameters and by different numbers of teeth. The three gearwheel portions define an input gearwheel portion 36, a first output gearwheel portion 37 and a second output gearwheel portion 38. The input gearwheel portion 36 is arranged here axially between the two output gearwheel portions 37, 38. In the first rotation position DL1, which is illustrated in FIG. 6, the reversing gearwheel 28 is situated in a first reversing position WS1 and is thereby integrated into the gear 16 so that the output gearwheel 17 is directly in engagement with the first output gearwheel portion 37. In the second rotation position DL2, which is illustrated in FIG. 7, the reversing gearwheel 28 takes up a second reversing position WS2 and in this second reversing position WS2 is integrated into the gear 16 so that the output gearwheel 17 is now directly in engagement with a first gearwheel portion 39 of the additional gearwheel 20, whereas the second output gearwheel portion 38 of the reversing gearwheel 28 is directly in engagement with a second gearwheel portion 40 of the additional gearwheel 20. In so far as, as here, only one single additional gearwheel 20 is provided, the second output gearwheel portion 38 is in engagement with the second additional gearwheel portion 40 of the same additional gearwheel 20. If, on the other hand, two or more additional gearwheels 20 are provided, the second output gearwheel portion 28 is in engagement with the second gearwheel portion 40 of another additional gearwheel 20.

As mentioned, also in this configuration of FIGS. 6 to 8, the gear 16 has the worm drive 21 with the worm 22 securely mounted on the input shaft 10. In the example which is shown, the input gearwheel portion 36 of the reversing gearwheel 28 is directly in engagement with the worm 22 both in the first reversing position WS1, therefore in the first rotation position DL1, and also in the second reversing position WS2, therefore in the second rotation position DL2.

As can be seen, the two reversing positions WS1 and WS2 of the reversing gearwheel 28 differ from one another in that the reversing gearwheel 28 is turned about a reversing axis through 180°, which runs perpendicularly through the rotation axis 29 of the reversing gearwheel 28. As the rotation axis 29 runs perpendicularly to the separation plane 3, this reversing axis extends parallel to the separation plane 3.

The invention claimed is:
1. An actuating device for mechanically actuating a component, comprising:
a housing, which has a first housing part and a second housing part, which lie against one another in a separation plane and which are fastened to one another;
an electric motor arranged in the first housing part and having an input shaft;
an output shaft rotatably mounted at least on the second housing part and penetrating a wall of the second housing part, the output shaft (i) is connected externally on the second housing part with an actuating element for mechanical coupling with the component which is to be actuated, or (ii) forms an actuating element for mechanical coupling with the component which is to be actuated; and
a gear train, which connects the input shaft with the output shaft and which has an output gearwheel rotatably connected with the output shaft;
wherein the second housing part, in relation to an axis of rotation running perpendicularly to the separation plane, is able to be fastened to the first housing part in at least two different rotation positions;
wherein the output shaft is arranged eccentrically to the axis of rotation on the second housing part;
wherein at least one of the first housing part and the second housing part have at least one bearing point for rotary bearing at least one additional gearwheel of the gear train;
wherein in a first rotation position between the first housing part and the second housing part, the gear train without the additional gearwheel connects the input shaft with the output shaft with a first transmission ratio;
wherein in a second rotation position different from the first rotation position, between the first housing part and the second housing part, the gear train with the additional gearwheel connects the input shaft with the output shaft with a second transmission ratio different from the first transmission ratio; and
wherein respective rotation axes of the additional gearwheel and of the output gearwheel run parallel to the axis of rotation, whereas a rotation axis of the input shaft runs transversely to the axis of rotation.

2. The actuating device according to claim 1, wherein one of:
the additional gearwheel is absent in the first rotation position and is present in the second rotation position; or
the additional gearwheel is present in the first rotation position, but is not integrated into the gear train, whereas in the second rotation position, the additional gearwheel is integrated into the gear train.

3. The actuating device according to claim 1, wherein:
the gear train has a worm drive, which has a worm rotatably connected with the input shaft, and a worm wheel directly in engagement with the worm; and
the additional gearwheel in the second rotation position is integrated into the gear train between the worm wheel and the output gearwheel.

4. The actuating device according to claim 3, wherein the worm wheel in the first rotation position is directly in engagement with the output gearwheel.

5. The actuating device according to claim 1, wherein:
the gear train has a worm drive, which has a worm rotatably connected to the input shaft;
the output gearwheel in the first rotation position is directly in engagement with the worm; and
the additional gearwheel in the second rotation position is integrated into the gear train between the worm and the output gearwheel.

6. The actuating device according to claim 5, wherein:
at least two additional gearwheels are provided; and
in the second rotation position, one of the additional gearwheels is directly in engagement with the worm, whereas the other of the two additional gearwheels is directly in engagement with the output gearwheel.

7. The actuating device according to claim 1, wherein:
the output shaft is rotatably mounted on the first housing part and on the second housing part;
the output shaft on the first housing part has a first bearing point, in which the output shaft is mounted in the first rotation position, and a second bearing point, in which the output shaft is mounted in the second rotation position; and
the output shaft on the second housing part has a bearing point, in which the output shaft is mounted in the first rotation position and in the second rotation position.

8. The actuating device according to claim 1, wherein:
the gear train has a reversing gearwheel, which has three axially adjacent gearwheel portions, which have different diameters and numbers of teeth, which form an input gearwheel portion, a first output gearwheel portion, and a second output gearwheel portion;
the input gearwheel portion is arranged axially between the first output gearwheel portion and the second output gearwheel portion;
in the first rotation position, the reversing gearwheel is integrated into the gear train in a first reversing position; and
in the second rotation position, the reversing gearwheel is integrated into the gear train in a second reversing position reversed with respect to the first reversing position.

9. The actuating device according to claim 8, wherein:
in the first rotation position, the output gearwheel is directly in engagement with the first output gearwheel portion; and
in the second rotation position, the output gearwheel is directly in engagement with a first gearwheel portion of the additional gearwheel and the second output gearwheel portion of the reversing gearwheel is directly in engagement with a second gearwheel portion of the additional gearwheel or another additional gearwheeel.

10. The actuating device according to claim 8, wherein:
the gear train has a worm drive, which has a worm rotationally connected to the input shaft; and
the input gearwheel portion of the reversing gearwheel in the first reversing position and in the second reversing position is directly in engagement with the worm.

11. The actuating device according to claim 1, wherein on the first housing part, a rotation position sensor is attached and which determines a current rotation position of the input shaft.

12. The actuating device according to claim 11, wherein in the housing, power electronics are arranged for electrical supply and activation of the electric motor, the power electronics being electrically coupled to the rotation position sensor and being accommodated in a same housing part as the rotation position sensor.

13. The actuating device according to claim 1, wherein on the second housing part, a rotation position sensor is attached and which determines a current rotation position of the output shaft.

14. An actuating device for mechanically actuating a component, comprising:
a housing, which has a first housing part and a second housing part, which lie against one another in a separation plane and which are fastened to one another;
an electric motor arranged in the first housing part and having an input shaft;
an output shaft rotatably mounted at least on the second housing part and penetrating a wall of the second housing part, the output shaft (i) is connected externally on the second housing part with an actuating element for mechanical coupling with the component which is to be actuated, or (ii) forms an actuating element for mechanical coupling with the component which is to be actuated; and
a gear train, which connects the input shaft with the output shaft, and which has an output gearwheel rotatably connected with the output shaft, and a worm drive, which has a worm rotatably connected with the input shaft, and a worm wheel directly in engagement with the worm;
wherein the second housing part, in relation to an axis of rotation running perpendicularly to the separation plane, is able to be fastened to the first housing part in at least two different rotation positions;
wherein the output shaft is arranged eccentrically to the axis of rotation on the second housing part;
wherein at least one of the first housing part and the second housing part have at least one bearing point for rotary bearing at least one additional gearwheel of the gear train;
wherein in a first rotation position between the first housing part and the second housing part, the gear train without the additional gearwheel connects the input shaft with the output shaft with a first transmission ratio;
wherein in a second rotation position different from the first rotation position, between the first housing part and the second housing part, the gear train with the additional gearwheel connects the input shaft with the output shaft with a second transmission ratio different from the first transmission ratio;

wherein one of:
the additional gearwheel is absent in the first rotation position and is present in the second rotation position; or
the additional gearwheel is present in the first rotation position, but is not integrated into the gear train, whereas in the second rotation position, the additional gearwheel is integrated into the gear train; and wherein respective rotation axes of the additional gearwheel and of the output gearwheel run parallel to the axis of rotation, whereas a rotation axis of the input shaft runs transversely to the axis of rotation.

15. The actuating device according to claim 14, wherein the additional gearwheel in the second rotation position is integrated into the gear train between the worm wheel and the output gearwheel.

16. The actuating device according to claim 14, wherein:
the output gearwheel in the first rotation position is directly in engagement with the worm; and
the additional gearwheel in the second rotation position is integrated into the gear train between the worm and the output gearwheel.

17. The actuating device according to claim 14, wherein:
the gear train has a reversing gearwheel, which has three axially adjacent gearwheel portions, which have different diameters and numbers of teeth, which form an input gearwheel portion, a first output gearwheel portion, and a second output gearwheel portion;
the input gearwheel portion is arranged axially between the first output gearwheel portion and the second output gearwheel portion;
in the first rotation position, the reversing gearwheel is integrated into the gear train in a first reversing position; and
in the second rotation position, the reversing gearwheel is integrated into the gear train in a second reversing position reversed with respect to the first reversing position.

18. The actuating device according to claim 17, wherein the input gearwheel portion of the reversing gearwheel in the first reversing position and in the second reversing position is directly in engagement with the worm.

19. An actuating device for mechanically actuating a component, comprising:
a housing, which has a first housing part and a second housing part, which lie against one another in a separation plane and which are fastened to one another;
an electric motor arranged in the first housing part and having an input shaft;
an output shaft rotatably mounted at least on the second housing part and penetrating a wall of the second housing part, the output shaft one of (i) being connected externally on the second housing part with an actuating element for mechanical coupling with the component which is to be actuated, or (ii) forming an actuating element for mechanical coupling with the component which is to be actuated; and
a gear train, which connects the input shaft with the output shaft and which has an output gearwheel rotatably connected with the output shaft;
wherein the second housing part, in relation to an axis of rotation running perpendicularly to the separation plane, is able to be fastened to the first housing part in at least two different rotation positions;
wherein the output shaft is arranged eccentrically to the axis of rotation on the second housing part;
wherein at least one of the first housing part and the second housing part have at least one bearing point for rotary bearing at least one additional gearwheel of the gear train;
wherein in a first rotation position between the first housing part and the second housing part, the gear train without the additional gearwheel connects the input shaft with the output shaft with a first transmission ratio;
wherein in a second rotation position different from the first rotation position, between the first housing part and the second housing part, the gear train with the additional gearwheel connects the input shaft with the output shaft with a second transmission ratio different from the first transmission ratio; and
wherein:
the output shaft is rotatably mounted on the first housing part and on the second housing part;
the output shaft on the first housing part has a first bearing point, in which the output shaft is mounted in the first rotation position, and a second bearing point, in which the output shaft is mounted in the second rotation position; and
the output shaft on the second housing part has a bearing point, in which the output shaft is mounted in the first rotation position and in the second rotation position.

* * * * *